(12) United States Patent
Bertram

(10) Patent No.: US 6,213,748 B1
(45) Date of Patent: Apr. 10, 2001

(54) MULTIPLE EXTRUSION HEAD FOR THE PRODUCTION OF PROFILES, IN PARTICULAR FOR TIRE PRODUCTION

(75) Inventor: Juergen Bertram, Eichelkamp (DE)

(73) Assignee: Hermann Berstorff Maschinenbau GmbH, Hannover (DE)

( * ) Notice: Subject to any disclaimer, the term of this patent is extended or adjusted under 35 U.S.C. 154(b) by 0 days.

(21) Appl. No.: 09/219,335

(22) Filed: Dec. 23, 1998

(30) Foreign Application Priority Data

Dec. 23, 1997 (DE) ................................................ 197 57 261

(51) Int. Cl.[7] ............................. B29C 47/06; B29C 47/14
(52) U.S. Cl. ...................... 425/133.5; 29/426.1; 29/428; 425/188; 425/192 R; 425/462
(58) Field of Search ................................ 425/133.5, 188, 425/190, 192 R, 462; 29/426.1, 428, 469

(56) References Cited

U.S. PATENT DOCUMENTS

| 4,137,027 | * | 1/1979 | Ruger | 425/188 |
| 4,526,528 | * | 7/1985 | Kline et al. | 425/133.5 |
| 4,983,113 | * | 1/1991 | Hirschkorn | 425/188 |
| 5,061,166 | * | 10/1991 | Gohlisch et al. | 425/188 |

FOREIGN PATENT DOCUMENTS

| 3238284 C2 | 8/1986 | (DE) . |
| 3729447 A1 | 3/1989 | (DE) . |

* cited by examiner

Primary Examiner—Harold Pyon
Assistant Examiner—Joseph Leyson
(74) Attorney, Agent, or Firm—Foley & Lardner

(57) ABSTRACT

The invention relates to a multiple extrusion head for the production of profiles, in particular for tire production, with a fixedly arranged head flange, into which extruders open, and with a closed head having flow ducts, an adapter and a profile strip, which closed head is arranged so as to be capable of being braced against the head flange and of being pivoted away. The invention is defined in that the closed head has a receptacle which is open in the direction of the head flange and in which at least one open flow duct insert is removably arranged.

12 Claims, 2 Drawing Sheets

US 6,213,748 B1

MULTIPLE EXTRUSION HEAD FOR THE PRODUCTION OF PROFILES, IN PARTICULAR FOR TIRE PRODUCTION

BACKGROUND OF THE INVENTION

The invention relates to a multiple extrusion head for the production of profiles, in particular for tire production.

Multiple extrusion heads are, as a rule, of divided design, in order to ensure easy access to the flow duct inserts. Easy access is necessary because the flow ducts must be cleaned when changing the mixture, which usually occurs frequently. Access is also necessary so that flow duct inserts of a different shape can be inserted in the event of a change of the profile dimensions. An extrusion head of this type is disclosed, for example, in DE 32 38 284 C2. Extrusion heads capable of being swung open have a fundamental disadvantage in that high internal pressure acts on both head parts and must be absorbed by means of a complicated interlocking mechanism. It is difficult to reliably control the high pressure which occurs in swing-open extrusion heads.

DE 37 29 447 A1 discloses an extrusion head where the extrusion head has a fixedly arranged head flange into which extruders open. A closed head is arranged on the head flange so as to be capable of being braced against the head flange and of being pivoted away from the head flange. The closed head has open flow ducts. An adapter and a profile strip are arranged in the head so as to be exchangeable at the rear of the head. However, this head does not allow one to vary the shape of the flow ducts, i.e., the guidance of the material, by exchange. Therefore, the range of use of this extrusion head is greatly limited.

SUMMARY OF THE INVENTION

An object of one embodiment of this invention is to provide a multiple extrusion head which does not require any interlocking of two head halves and yet allows easy cleaning and rapid conversion of the flow ducts in the head for different runs.

According to one embodiment of this invention a multiple extrusion head for the production of profiles comprises a fixedly arranged head flange, extruders open to said head flange, a closed head arranged so as to be capable of being braced against said head flange, wherein said closed head has a receptacle which is open in the direction of said head flange and in which at least one open flow duct insert having flow ducts is removably arranged, and an adapter and a profile strip in said closed head and arranged downstream of said flow ducts.

According to an embodiment of this invention, the receptacle tapers in a wedgelike manner in the direction of the adapter.

According to an embodiment of this invention, the closed head is arranged so as to be capable of being pivoted away from the head flange.

According to an embodiment of this invention, the closed head is capable of being pivoted away from the head flange about a vertical axis of rotation.

According to an embodiment of this invention, the multiple extrusion head may comprise a clamping device capable of bracing the closed head against the head flange.

According to another embodiment of this invention a multiple extrusion head for the production of profiles comprises a fixedly arranged head flange, extruders open to the head flange, a closed head, wherein the closed head is arranged so as to be capable of being braced against the head flange, and wherein the closed head has a receptacle which is open in the direction of the head flange and in which at least one open flow duct insert having flow ducts is removably arranged.

According to yet another embodiment of the invention, a method of inserting at least one open flow duct insert in a multiple extrusion head for the production of profiles comprises removably arranging the at least one open flow duct insert having flow ducts in a receptacle of a closed head, fixedly arranging a head flange so that the closed head is braced against the head flange, and wherein the receptacle is open in the direction of the head flange, and flanging extruders to the head flange so that the extruders are open to the head flange.

According to yet another embodiment of the invention, a method of removing at least one open flow duct insert from a multiple extrusion head for the production of profiles comprises removing a braced head flange from a closed head, where the closed head has a receptacle which is open in the direction of the head flange, and where the receptacle has the at least one open flow duct insert removably arranged therein, and removing the at least one open flow duct removably arranged in the receptacle.

An exemplary embodiment is illustrated in the drawings and is described in more detail below.

DETAILED DESCRIPTION OF THE PREFERRED EMBODIMENTS

According to one embodiment of this invention, a closed head has a receptacle which is open in the direction of the head flange and in which at least one flow duct insert open toward the head is removably arranged. One advantage of this arrangement is that the closed head does not require a complicated interlocking device. The internal pressure is absorbed by the head. The head may be pulled against the head flange in the region of sealing faces merely by employing a clamping device because the forces which occur in the region of the sealing faces are comparatively low. The design of the head in this invention makes it possible to extract the open flow duct inserts easily, and allows rapid conversion of the flow ducts to different runs in the multiple extrusion head. Unexpectedly, this invention demonstrates that it is possible to arrange open flow ducts in a receptacle of a closed head, where the receptacle is open to the head flange. Leaks which might be expected in the region of the relatively long interfaces with the inner walls of the head can be controlled perfectly well by employing precise production methods.

According to one embodiment of the invention, the multiple extrusion head for the production of profiles, in particular for tire production, has a fixedly arranged head flange, into which extruders open, a closed head, an adapter and a profile strip, where the closed head is arranged so as to be capable of being braced against the head flange.

According to another embodiment of the invention, the multiple extrusion head for the production of profiles, has a fixedly arranged head flange, into which extruders open, a closed head, where the closed head is arranged so as to be capable of being braced against the head flange.

According to a preferred embodiment of the invention, the receptacle of the closed head, where the receptacle is open in the direction of the head flange, is tapered in a wedgelike manner in the direction of the adapter. This taper design enhances the sealing-off action due to the influence of the closing forces and mass pressure due to the wedge effect between the flow duct insert and the inner wall of the closed head.

In a further embodiment, the closed head is capable of being pivoted away from the head flange about a vertical axis of rotation. This design makes it considerably easier to handle the multiple extrusion head.

Figure 1:
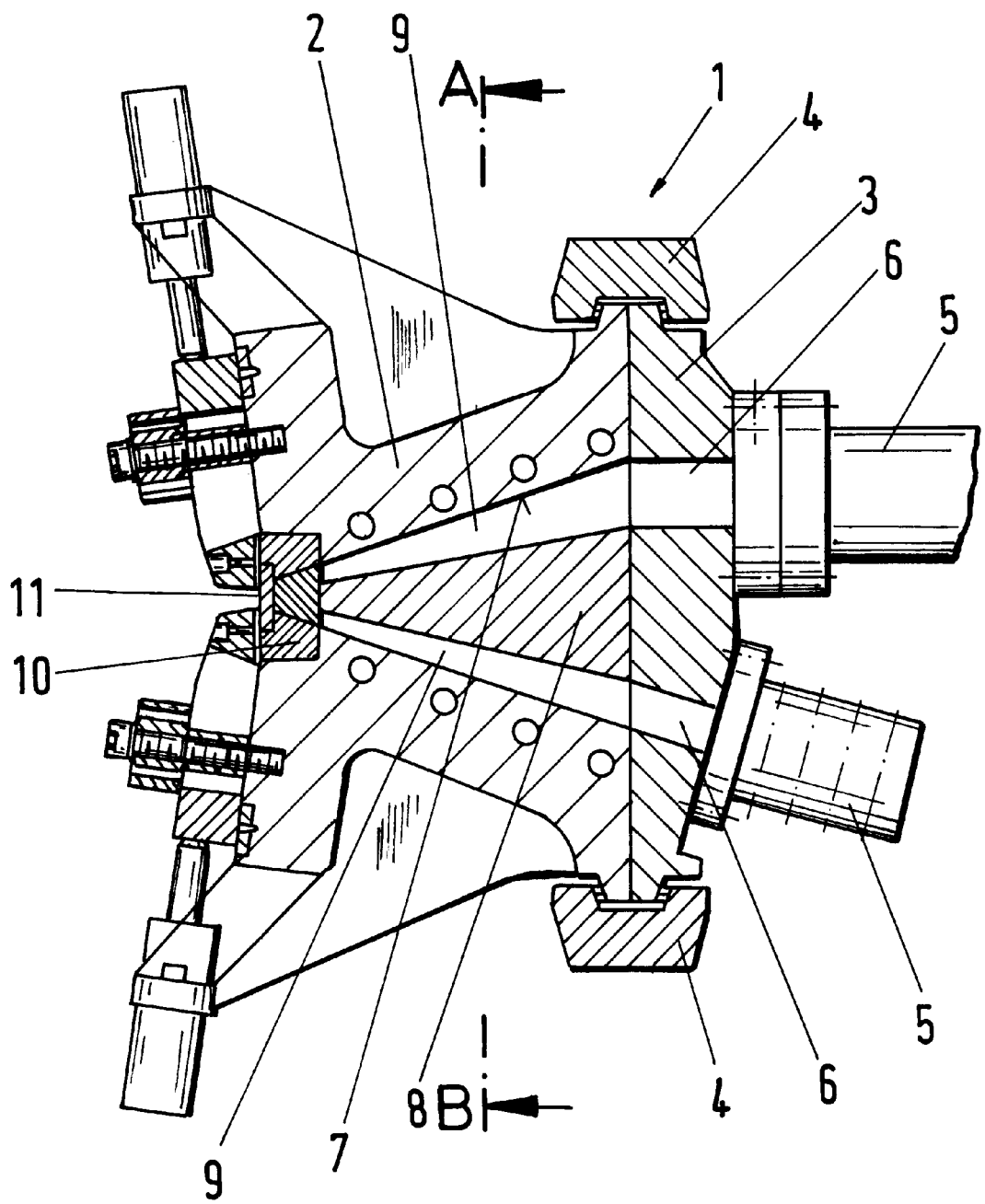
FIG. 1 is a view of a multiple extrusion head of the present invention in longitudinal cross-section.

In FIG. 1 a multiple extrusion head 1 has a closed head 2 which is capable of being braced against a head flange 3 by means of a clamping device 4. Flanged to the head flange 3 are two extruders 5, of which the worms, not illustrated in the drawing, open into ducts 6 of the head flange 3.

The closed head 2 has a receptacle 7 which is open in the direction of the head flange 3 and which tapers in a wedgelike manner in the direction of the flow of material. An open flow duct insert 8 is removably arranged in the receptacle 7. The flow duct insert 8 has two flow ducts 9. The flow ducts 9 are opened in the direction of the walls of the receptacle 7. The adjacent walls of the flow duct insert 8 bear sealingly on the walls of the receptacle 7 of the closed head 2.

An adapter 10 is arranged in the closed head 2 downstream of the flow duct insert 8 in the direction of flow of material. A profile strip 11 is fastened in front of the adapter 10.

Figure 2:
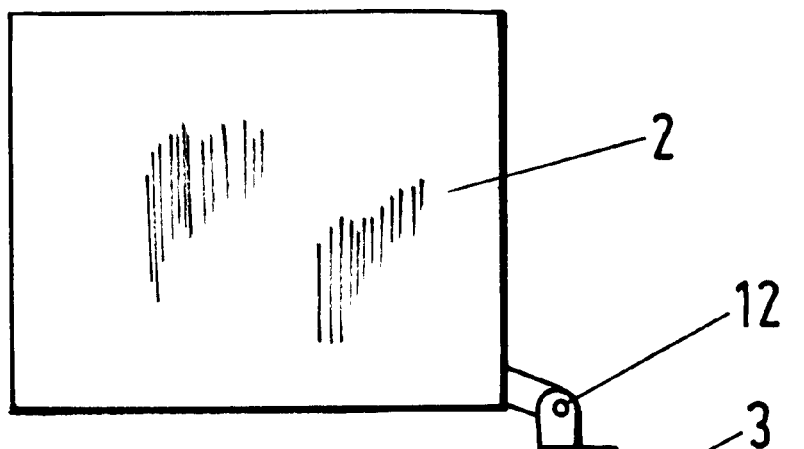
FIG. 2 is a diagrammatic illustration of a swung-open multiple extrusion head of the present invention.
Figure 3:
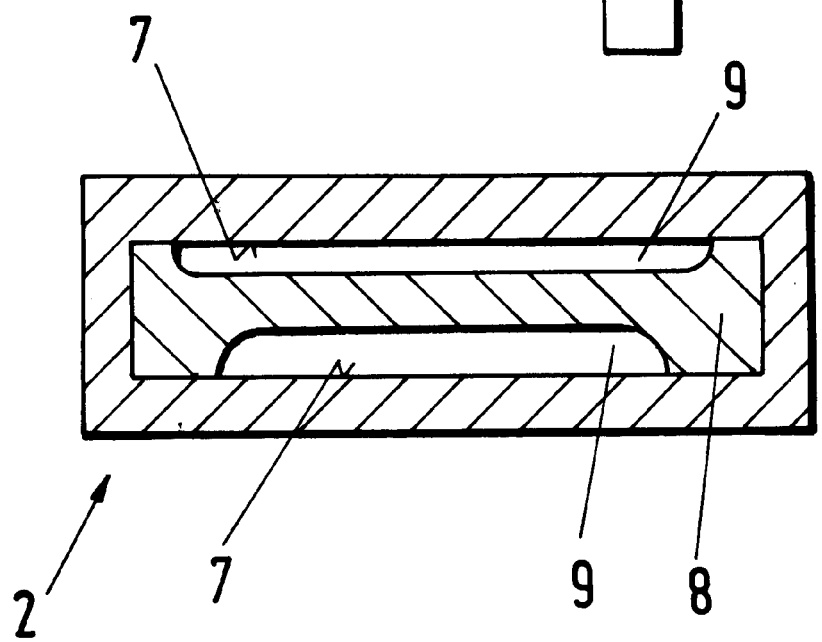
FIG. 3 is a section view along the line A/B through the extrusion head according to FIG. 1.

As is evident from FIG. 2, the closed head 2 is capable of being pivoted away from the head flange 3 about a vertical axis of rotation 12. It is then possible to remove the flow duct insert 8 from the receptacle 7 for cleaning or for exchange.

Of course, three or four or even more extruders 5 may also be flanged to the head flange 3. A plurality of flow duct inserts 8 may also be arranged in the receptacle 7 of the closed head 2. The forces occurring as a result of the high internal pressure building up in the head 2 are advantageously largely absorbed by the walls of the head 2. The clamping device 4 may be of relatively simple design, since it merely has to absorb the very much lower forces occurring in the sealing region between the head 2 and the head flange 3. This results in a considerable cost saving. At the same time, very easy and rapid access to the flow duct inserts 8 is achieved.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multiple extrusion head for the production of profiles comprising:
    a fixedly arranged head flange;
    extruders open to said head flange;
    a closed head arranged so as to be capable of being braced against said head flange, wherein said closed head has a receptacle which is open in the direction of said head flange and in which at least one open flow duct insert having flow ducts is removably arranged; and
    an adapter and a profile strip in said closed head and arranged downstream of said flow ducts, wherein said receptacle tapers in a wedgelike manner in the direction of the adapter.

2. The multiple extrusion head as claimed in claim 1, wherein said closed head is arranged so as to be capable of being pivoted away from the head flange.

3. The multiple extrusion head as claimed in claim 2, wherein the closed head is capable of being pivoted away from the head flange about a vertical axis of rotation.

4. The multiple extrusion head as claimed in claim 1, wherein the the profile strip is a tire profile strip.

5. The multiple extrusion head as claimed in claim 1, further comprising:
    a clamping device capable of bracing said closed head against said head flange.

6. The multiple extrusion head as claimed in claim 1, wherein said extruders are flanged to said head flange.

7. The multiple extrusion head as claimed in claim 1, wherein said extruders comprise two extruders.

8. The multiple extrusion head as claimed in claim 1, wherein said extruders comprise three or four extruders.

9. A multiple extrusion head for the production of profiles comprising:
    a fixedly arranged head flange;
    extruders open to said head flange;
    a closed head;
    wherein said closed head is arranged so as to be capable of being braced against said head flange; and
    wherein said closed head has a receptacle which is open in the direction of said head flange and in which at least one open flow duct insert having flow ducts is removably arranged, wherein said receptacle tapers in a wedgelike manner in the direction away from the head flange.

10. A method of inserting at least one open flow duct insert in a multiple extrusion head for the production of profiles comprising:
    removably arranging the at least one open flow duct insert having flow ducts in a receptacle of a closed head;
    fixedly arranging a head flange so that the closed head is braced against the head flange, and wherein the receptacle is open in the direction of the head flange;
    arranging an adaptor in the closed head downstream of the at least one flow duct insert, where the receptacle tapers in a wedgelike manner in the direction of the adaptor; and
    flanging extruders to the head flange so that the extruders are open to the head flange.

11. A method of removing at least one open flow duct insert from a multiple extrusion head for the production of profiles comprising:
    removing a braced head flange from a closed head, where the closed head has a receptacle which is open in the direction of the head flange, and where the receptacle has the at least one open flow duct insert removably arranged therein;
    arranging an adaptor in the closed head downstream of the at least one flow duct insert, where the receptacle tapers in a wedgelike manner in the direction of the adaptor; and
    removing the at least one open flow duct insert removably arranged in the receptacle.

12. The method of claim 11 further comprising:
    inserting the at least one open flow duct in the receptacle prior to the removing steps.

* * * * *